Feb. 9, 1954 W. S. BURDICK ET AL 2,668,922
TORQUE TRANSMITTING EDDY-CURRENT APPARATUS
Filed May 1, 1952 2 Sheets-Sheet 2
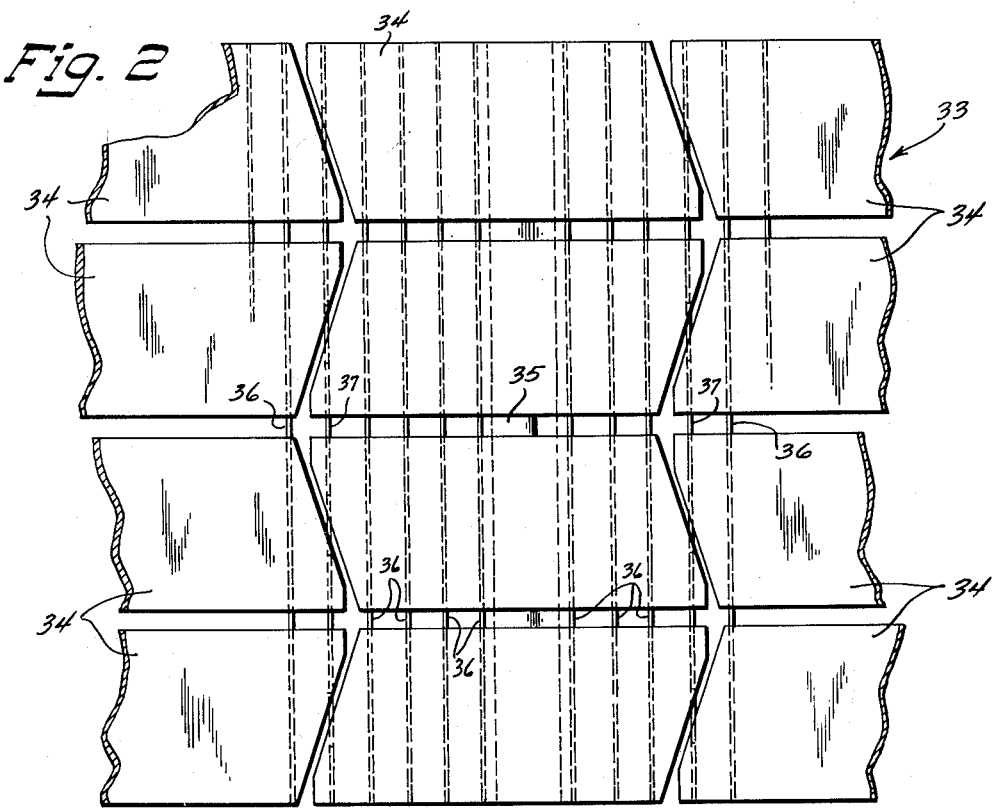
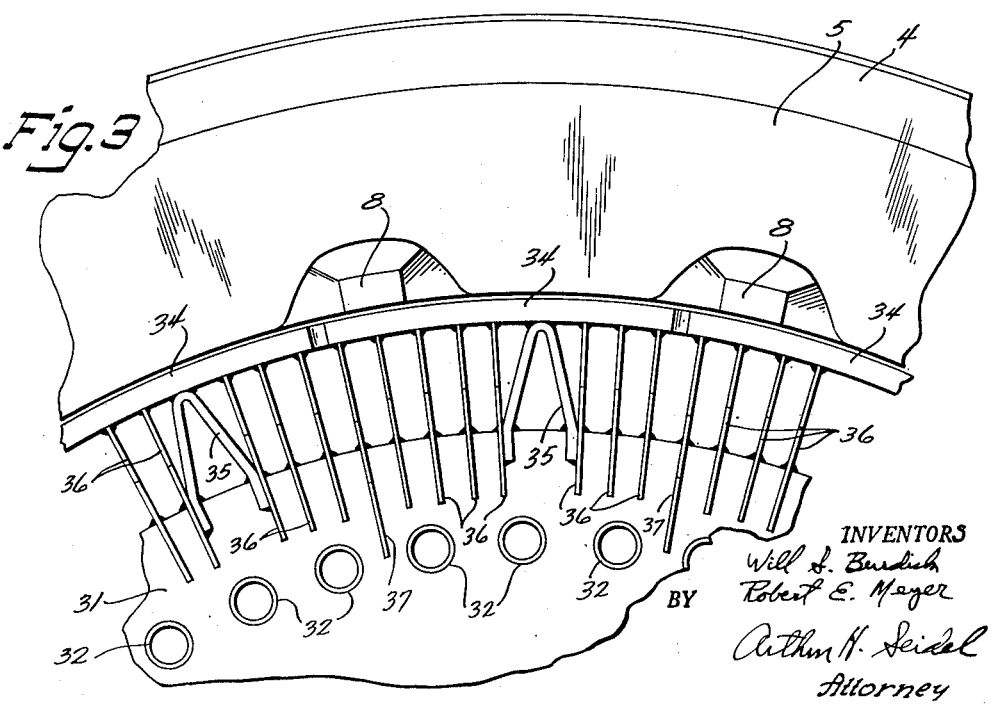
INVENTORS
Will S. Burdick
Robert E. Meyer
BY
Arthur H. Seidel
Attorney Patented Feb. 9, 1954

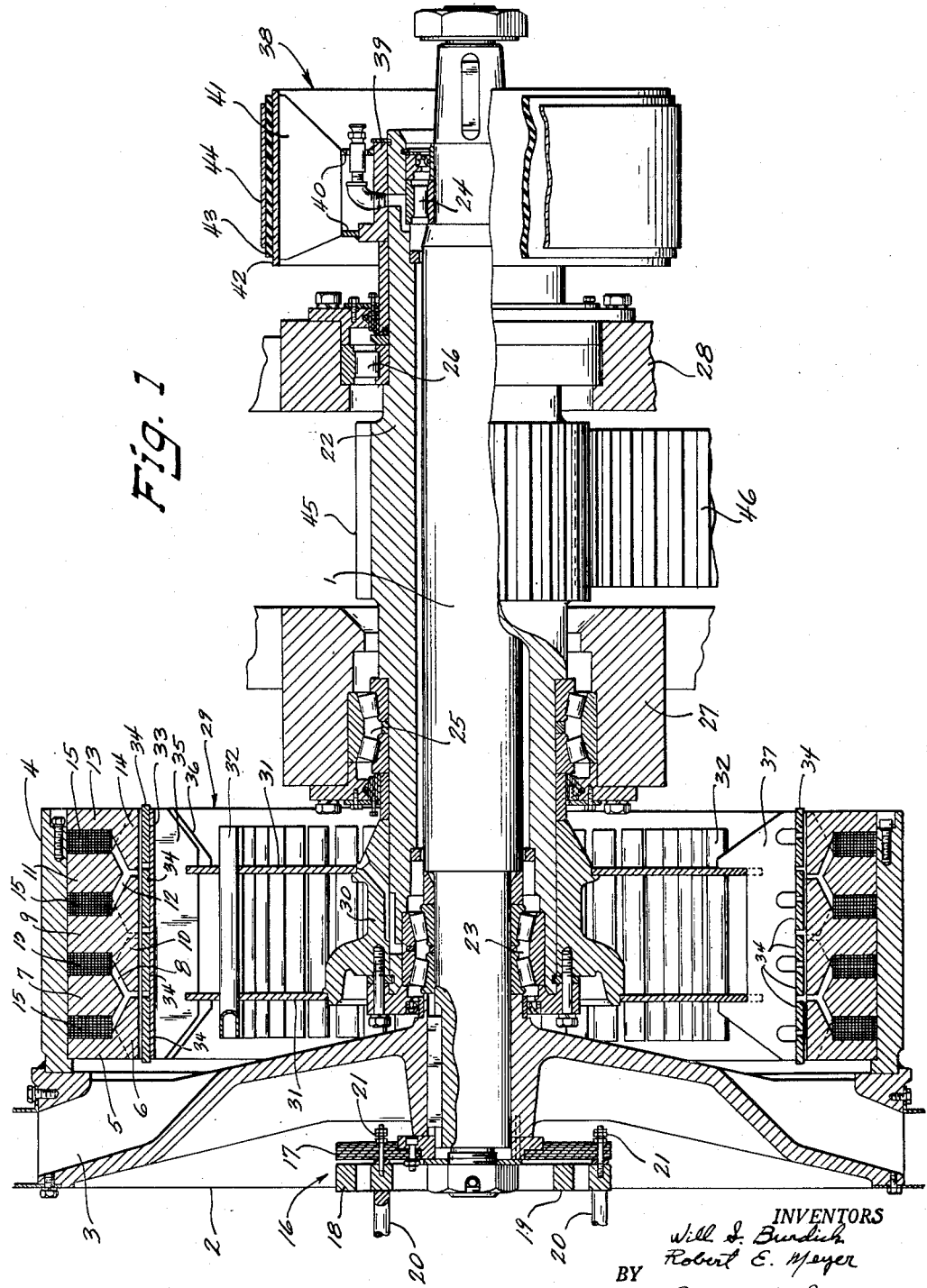

2,668,922

UNITED STATES PATENT OFFICE 2,668,922

TORQUE TRANSMITTING EDDY-CURRENT APPARATUS

Will S. Burdick, Wauwatosa, and Robert E. Meyer, Shorewood, Wis., assignors to Harnischfeger Corporation, Milwaukee, Wis., a corporation of Wisconsin Application May 1, 1952, Serial No. 285,434

4 Claims. (Cl. 310—105)

This invention relates to eddy current torque transmitting apparatus in which a drum of magnetic material is mounted for relative rotation with respect to a magnetic field member and it resides more specifically in an improvement in the drum portion of such apparatus wherein the drum is divided into segments that may expand circumferentially with temperature changes to relieve the drum of thermally induced stresses and to minimize thermally induced changes in drum diameter, the segments each being anchored at their centers to a drum support, having sufficient strength and rigidity to transmit substantially the entire torque reaction, with expandable overhanging end portions on each side of the anchored center that are connected in turn with the drum support by easily deflected heat dissipating cooling fins sufficiently yieldable to be incapable of transmitting the torque reaction and being of such thin section as to yield without destructive stress occurring therein in response to the thermal expansion occurring in the overhanging portions of said segments.

Eddy current torque transmitting apparatus as is employed for brakes and clutches have high rates of heat generation in the eddy current members. As the torque transmitted increases heat generation correspondingly increases and temperatures encountered in the eddy current members become excessive and limit the output of the apparatus. In order to minimize the resulting thermally induced expansion of the heated eddy current members the apparatus is designed to rapidly dissipate the heat. It is also desirable that expansion of the eddy current members be provided for without incurring a material change in air gap dimension. Since it is advantageous to employ small air gaps in order to attain maximum torque output a variation in the gap due to thermal expansion in a radial direction may cause either a destructive binding of the field and eddy current members or a large relative change in the gap dimension that materially affects the torque output values.

To provide a low inertia member and to effectively dissipate heat due to the induced eddy currents the eddy current member has been formed as a thin walled drum supported from a hub by a plurality of spaced fins. The drum has been circumferentially segmented to permit circumferential expansion and the fins supporting the segments act to both carry heat away from the areas of generation and to transmit the torque reaction of the device. Since it is desired that eddy current apparatus of this nature be utilized primarily as a torque transmitter of maximum capacity per unit of apparatus the fins must necessarily have substantial cross-section in order to transmit the torque without incurring rupture. The circumferential deflection of the fins is thus limited. Such deflection will be resisted and the thermal expansion of the segments comprising the drum is therefore curtailed circumferentially and the radial expansion that accompanies temperature increase is appreciable.

Eddy current drum segments, of reasonable length, permitted to expand unrestrained circumferentially will have a maximum circumferential displacement that may effect fatigue failure in the supporting fins joined to the segments at the points of such maximum displacement, unless the fin width is made quite small. Thin fins of such reduced width are ineffectual for transmission of torque reaction. Resort may be made to an increased number of fins. This increase however would again restrain circumferential expansion of the segments. Furthermore, a reduction in fin width will permit greater circumferential deflection due to torque transmission. This augmented deflection will call for increased yieldability of the fins if fatigue failure is to be avoided. Consequently a compromise must be made in the choice of fin dimension that will restrict circumferential expansion to a degree necessitated by the attainment of necessary fin strength.

Permissible temperature increase of the drum may be limited for a device of given weight and dimension by the rating given the device. The capacity, limited in this manner, does not, however, effectively utilize the device. It has been the practice to reach a practical compromise of the foregoing factors that gives a relatively high capacity within permissible limits of temperature rise and fin width and spacing.

It is an object of this invention to provide an eddy current drum for an induced current torque transmitter that is segmented circumferentially to allow circumferential expansion and that will have a minimum of radial expansion with temperature rise.

It is another object of this invention to provide an eddy current drum segmented circumferentially with each segment thereof supported for unrestricted thermal expansion along its circumferential extent in either circumferential direction from the center portion that is anchored with respect to a supporting hub.

It is a further object of this invention to provide a segmented eddy current drum having cooling fins extending therefrom and anchored at their opposite ends to a drum support which fins may be deflected circumferentially for the maximum possible circumferential thermal expansion of the segments of the drum without possible occurrence of fatigue failure.

These and other objects and advantages of this invention will appear in the description to follow. In the description reference is made to the accompanying drawings in which there is shown by way of illustration and not of limitation one specific form in which this invention may be embodied.

In the drawings:

Fig. 1 is a longitudinal view in elevation and in section of an induced current torque transmitter in which this invention is embodied, Fig. 2 is a fragmentary top plan view of the eddy current member of the induced current torque transmitter shown in Fig. 1, and Fig. 3 is a fragmentary end view in elevation of a portion of the eddy current and field members of the induced current torque transmitter shown in Fig. 1.

Referring now to the drawings, there is shown in Fig. 1 an input shaft 1 extending for the length of the apparatus which is adapted at the right hand end thereof for attachment to an output shaft of a prime mover or other driver, not shown. At the left hand end of the input shaft 1 is mounted a circular fly wheel plate 2 that is keyed to the shaft 1 to rotate therewith. The fly wheel plate 2 is formed with a plurality of circumferentially spaced radially extending cooling air ducts 3 and secured to the peripheral margin of the plate 2 is a relatively thin walled circular cylindrical field frame 4. Seated against the inner wall of the frame 4 is an annular toothed ring 5 with teeth 6 circumferentially spaced from one another extending inwardly to form pole faces for the field member. The teeth 6 are spaced evenly from one another and each extends in a taper to the right as shown in Fig. 1. The taper presents pole faces of roughly frusto-triangular configuration. A second annular toothed ring 7, also seated within the field frame 4, is spaced to the right of the ring 5 to form a channel between the rings 5 and 7. Circumferentially spaced teeth 8 of the ring 7 extend inwardly similarly as the teeth 6 to form a ring of pole faces. The teeth 8 also taper to both the left and to the right, as shown in Fig. 1. Those portions of the teeth 8 extending to the left fall between and are interdigited with the teeth 6 of ring 5, so that as one proceeds about the resulting ring of interlapping pole faces they are alternately composed of teeth 6 and 8.

A third annular toothed ring 9 with inwardly extending pole teeth 10 is spaced to the right of the ring 7. The teeth 10 are aligned circumferentially with the teeth 6 of the ring 5 and are shaped similar as the teeth 8 of ring 7 so as to extend both to the left and to the right. A fourth ring 11 similar to the rings 7 and 9 is disposed at a spaced distance from the ring 9 and the pole teeth 12 thereof are circumferentially aligned with the teeth 8 of the ring 7. An annular toothed outer ring 13 spaced to the right of the ring 11 that is similar to the left hand outer ring 5 completes the set of pole piece members which are mounted on the field frame 4 to form the magnetic circuit of the field member of the apparatus. Teeth 14 of the ring 13 extend to the left only and are in circumferential alignment with the teeth 10 of the ring 9 and the teeth 6 of the ring 5.

A series of four annular field coils 15 each disposed within one of the annular channels formed by the spaced rings 5, 7, 9, and 11 and 13 provide magnetic flux when energized for each set of interdigited teeth. The flux pattern that is formed by the field member is conventional and well known.

A slip ring assembly 16 for the field coils 15 is mounted on the input shaft 1 directly to the left of the fly wheel plate 2. A mounting plate 17 has fixed thereon two slip rings 18 and 19 each of which has bearing thereupon a brush 20 supported in well known fashion and connected to a source of electric energy. Terminals 21 are electrically connected to the slip rings 18 and 19 and leads, not shown, join the field coils 15 to the terminals 21 to provide for the energization thereof.

Encircling the input shaft 1 is a pinion sleeve 22 that is mounted for rotation independent of the shaft 1. Roller bearings 23 and 24 that seat within the sleeve 22 support the shaft 1 so that it may rotate freely and the sleeve 22 is in turn mounted by roller bearings 25 and 26 that are housed in suitable mounting brackets 27 and 28 which form a part of any general apparatus in conjunction with which the torque transmitting apparatus of this invention is employed.

Mounted upon and rotatable with the pinion sleeve 22 is an eddy current member 29 disposed within the area circumscribed by the pole faces of the pole teeth 6, 8, 10, 12 and 14. Eddy current member 29 has a hub 30 mounted directly upon the pinion sleeve 22 and joined securely to the hub 30 are two circular radially extending axially spaced diaphragm plates 31. Extending between and passing through the plates 31 to overhang beyond the same are a number of circumferentially spaced heat dissipating tube 32 composed of a material having a high heat conductivity. The tubes 32 are disposed radially inward from the outer periphery of the circular plates 31 and are integrally joined thereto to effect an efficient heat transfer from the peripheral portions of the plates 31 to the tubes 32. Heat spreading from the edges of the plates 31 will then be retarded from further flow toward the hub 30.

Disposed radially beyond the periphery of the diaphragm plates 31 is a segmented eddy current drum 33 that forms the rim of the eddy current member 29. The drum 33 is divided both axially and circumferentially into a plurality of segments 34 such that there is presented four rings of segments, each ring comprised of segments disposed in circumferential end to end position. Joining the segments 34 to the diaphragm plates 31 are a number of two legged anchorages 35 as is more clearly shown in Fig. 3, in which the legs meet at the point of juncture with the segments 34 and diverge as they extend inwardly toward the plates 31. As is shown in Fig. 2 each anchorage 35 extends for the axial length of the drum 34 to support four axially aligned segments at the approximate center portion of each. The support thus provided by the anchorages 35 acts to rigidly secure the center portion of the respective segments 34 to the diaphragm plates 31, to provide for the entire transmission of the torque developed by the apparatus through anchorage means for the eddy current drum 33 that are not subject to circumferential displacement as heating occurs in the drum 33. The portions of the segments 34 that overhang beyond the rigidly anchored connections and extend circumferentially to either side are free to expand and contract with temperature change, or to be displaced slightly without restraint from the supporting means.

Extending radially between the under surfaces of the segments 34 and the diaphragms 31 are a number of thin cooling fins, designated by the reference numerals 36 and 37, that are of high heat conductivity. Fins 37 join with the end portions of the segments 34 and the fins 36 are spaced between the end fins 37 and the twin legged anchorages 35. The fins 36 and 37 are joined to the respective segments 34 with solid welds that effectively conduct heat away from the segments 34 to the fines. The fins 36 and 37 extend inward from the drum 33 to be anchored to the diaphragm plates 31 for adequate support and to allow the fins 36 and 37 to further act as tension members to restrain the drum segments 34 from defleting radially outward.

The longitudinally or axially extending spacings between drum segments that divide the drum 33 into circumferentially extending segments 34 in end to end relation are skewed with respect to the field member of the apparatus in order to reduce magnetic vibrations. The skewing of the gaps between segments gives each segment 34 a parallelogram shaped face as is shown in Fig. 2. The cooling fins 37, that are connected to the ends of the segments 34, are consequently attached to a trailing end of one segment 34 and the leading end of the circumferentially adjacent segment 34. Each fin 37 extends across the axial length of the drum 33 to be connected in like manner with a pair of segments 34 in each of the four circumferential rings of drum segments 34. Consequently each fin 37 is subject to circumferential displacement in opposite directions as the segments 34 expand with temperature increase. This is due to the expansion of trailing edges of the segments 34 in one direction and the expansion of the leading edges in the opposite direction. A fin 37 is shown in the lower half of Fig. 1, in which there are shown cutouts in the fin 37 at the points where it crosses from a leading edge to a trailing edge. Cooling fins 37 formed with such cutouts are extended radially inwardly to a greater depth than the other fins 36 to provide for sufficient strength.

The pinion sleeve 22 has integrally formed therewith a pinion 45, which is disposed between the mounting walls 27 and 28, to provide a power takeoff from the eddy current apparatus. A gear 46, partially shown, is in mesh with the pinion 45.

Disposed on the right end of the pinion sleeve 22 is a brake assembly 38. A hub 39 is joined to the sleeve 22 and a pair of radially extending diaphragms 40 extend outward from the hub 39. A plurality of drum supporting plates 41 are joined to the outer peripheries of the diaphragms 40. A brake drum 42 is supported and joined to the outer ends of the plates 41 and disposed about the brake drum 42 is a brake lining 43 and brake band 44 which are supported and operated in well known manner, by means not shown.

Upon rotation of the input shaft 1 the field member, comprising the fly wheel mounting plate 2 and field frame 4 with its field coils 15 and associated annular toothed rings 5, 7, 9, 11 and 13, likewise rotates. Energization of the field coils 15 creates a field flux which will sweep through the segmented eddy current drum 33 in conventional manner to induce eddy currents therein. Electromagnetic forces will then urge the eddy current member 29 to be likewise set into rotation. A rotation of the eddy current member 29 will carry the pinion sleeve 22 therewith thus causing the pinion 45 to deliver output torque to the gear 46. Upon deenergization of the field coils 15 the rotation of the shaft 22 and pinion 45 may be halted by operation of the brake assembly 38. There is thus provided an apparatus of the eddy current type for torque transmission.

Under heavy duty operating conditions heating within the eddy current drum 33 is a limiting factor in the performance of the apparatus. A small air gap is desirable and the supporting means for the drum 33 must transmit the torque reaction without structural failure. Dissipation of the heat generated should be rapid. However, the temperature rise in the drum 33 is nevertheless substantial and the thermally induced stresses must be relieved. Thus a segmentation of the drum 33 is made. To fully benefit from the segmentation circumferential expansion of the individual segments 34 should not be restrained. It is the practice of this invention to anchor the segments 34 to allow maximum circumferential expansion, so as to limit radial expansion which would detrimentally affect air gap width between the field and eddy current members, while simultaneously rigidly anchoring the segments 34 to eliminate displacement due to torque reaction. To this end a central anchorage is employed for each drum segment and cooling fins extending from the drum are of thin section incapable of transmitting the torque reaction or restraining circumferential expansion of the segments.

We claim:

1. In a torque transmitting eddy current apparatus having a field member with windings adapted to be excited to establish a magnetic flux and a drum of magnetic material relatively rotatable with respect to said field member disposed in flux conducting relation thereto, the improvement in said drum which comprises a substantially non-deformable drum support, a plurality of segmental drum shoes arranged in end to end relation with the surfaces thereof facing said field member and disposed in a substantially common surface of revolution, a single substantially non-deformable torque transmitting anchorage for each of said shoes secured to said drum support and each extending therefrom radially to an anchorage with its respective shoe to provide thermally expandable overhanging shoe portions, and a plurality of thin yieldable heat dissipating fins for the overhanging portions of each of said shoes secured in heat conducting relation to said shoes and extending radially therefrom.

2. In a torque transmitting eddy-current apparatus having a field member with windings adapted to be excited to establish a magnetic flux and a drum of magnetic material relatively rotatable with respect to said field member disposed in flux conducting relation thereto, the improvement in said drum which comprises a substantially non-deformable drum support; a plurality of segmental drum shoes spaced from said drum support and from one another, said shoes being arranged end to end circumferentially with the surfaces thereof facing said field member disposed in a substantially common surface of revolution, a single substantially nondeformable torque transmitting anchorage for each of said shoes secured to said drum support and extending therefrom radially to an anchorage with its respective shoe near the center of said shoe to provide opposite thermally expandable overhanging end portions, and a plurality of thin yieldable heat dissipating fins for the overhanging portions of each of said shoes secured in heat conducting relation to said shoes and extending therefrom radially to an attachment with said drum support the section of said fins being insufficient to render the fins capable without said anchorage of transmitting the torque of which the apparatus is capable.

3. In a torque transmitting eddy-current apparatus having a field member with windings adapted to be excited to establish a magnetic flux and a drum of magnetic material relatively rotatable with respect to said field member disposed in flux conducting relation thereto the improvement in said drum which comprises a shaft-mounted substantially non-deformable drum support, a plurality of segmental drum shoes concentrically disposed in relation to said drum support and spaced therefrom and from one another, said shoes being arranged end to end circumferentially with the surfaces thereof facing said field disposed in a substantially common surface of revolution, a substantially non-deformable radially tapered torque transmitting anchorage for each of said shoes having a base of maximum circumferential width secured to said drum support and extending therefrom radially to an anchorage with its respective shoe near the center of said shoe to provide opposite thermally expandable overhanging end portions, and a plurality of thin yieldable heat dissipating fins for the overhanging portions of each of said shoes disposed in radial planes secured in heat conducting relation to said shoes and extending therefrom radially to an attachment with said drum support, said fins being sufficiently thin in a circumferential direction in relation to the maximum circumferential thermally induced dimensional changes which may occur in said overhanging portions of each of said shoes whereby maximum fibre stress in said fins will not exceed a value such as to cause fatigue failure in said fins, the section of said fins being insufficient to render the fins capable without said anchorages of transmitting the torque of which the apparatus is capable.

4. In a torque transmitting eddy-current apparatus having a field member with windings adapted to be excited to establish a magnetic flux and a drum of magnetic material relatively rotatable with respect to said field member disposed in flux conducting relation thereto, the improvement in said drum which comprises a shaft-mounted substantially non-deformable drum support, a plurality of segmented annular drum portions of like diameter axially spaced from one another and concentrically disposed in relation to said drum support, the segments of said drums being arranged end to end circumferentially and spaced from one another to permit unrestricted thermal expansion, a single substantially non-deformable torque transmitting anchorage for each of said drum segments secured to said drum support and extending therefrom radially to an anchorage with its respective segment near the center of said segment to provide opposite thermally expandible overhanging end portions, and a plurality of thin yieldable heat dissipating fins for the overhanging portions of each of said segments secured in heat conducting relation to said shoes and extending therefrom radially to an attachment with said drum support, said fins being sufficiently thin in a circumferential direction in relation to the maximum circumferential thermally induced dimensional changes which may occur in said overhanging portions of said segments whereby maximum fibre stress in said fins will not exceed a value such as to cause fatigue failure in said fins, the section of said fins being insufficient to render the fins capable without said anchorages of transmitting the torque of which the apparatus is capable.

WILL S. BURDICK.
ROBERT E. MEYER.

References Cited in the file of this patent

UNITED STATES PATENTS

| Number | Name | Date |
|---|---|---|
| 2,454,364 | Winther | Nov. 23, 1948 |
| 2,594,931 | Jaeschke | Apr. 29, 1952 |